United States Patent

Schulz

[11] Patent Number: 5,984,817
[45] Date of Patent: Nov. 16, 1999

[54] CHAIN WHEEL

[75] Inventor: Peter Schulz, Neufahrn, Germany

[73] Assignee: Joh. Winklhofer & Soehne GmbH Co. KG, Munich, Germany

[21] Appl. No.: 08/984,208

[22] Filed: Dec. 3, 1997

[30] Foreign Application Priority Data

Dec. 4, 1996 [DE] Germany .................. 296 21 084 U

[51] Int. Cl.$^6$ .................................................. F16H 55/30
[52] U.S. Cl. ........................... 474/156; 474/160; 474/161
[58] Field of Search .................................. 474/152, 155, 474/161, 153, 156, 157

[56] References Cited

U.S. PATENT DOCUMENTS

| | | |
|---|---|---|
| 1,808,369 | 6/1931 | Munroe . |
| 4,332,574 | 6/1982 | Aoyama et al. ............ 474/161 |
| 4,348,199 | 9/1982 | Oonuma et al. ............ 474/156 |
| 5,123,878 | 6/1992 | Nagano ........................ 474/160 |
| 5,133,695 | 7/1992 | Kobayashi .................. 474/160 |
| 5,224,903 | 7/1993 | Langhof et al. ............ 474/152 |
| 5,437,582 | 8/1995 | Romano ...................... 474/156 |

FOREIGN PATENT DOCUMENTS

| | | |
|---|---|---|
| 0 021 839 | 1/1981 | European Pat. Off. . |
| 0 522 984 A1 | 1/1993 | European Pat. Off. . |
| 1 186 486 | 8/1959 | France . |
| 2 325 804 | 4/1977 | France . |
| 821 303 | 11/1951 | Germany . |
| 57-190160 | 11/1982 | Japan . |

*Primary Examiner*—Thomas R. Hannon
*Attorney, Agent, or Firm*—Seed and Berry LLP

[57] ABSTRACT

Chain wheel for a chain drive assembly having a driven and/or driving chain wheel including teeth and tooth spaces, the flanks or profiles of which optionally are defined by circle sections or involutes, each tooth space being designed with a concave roll bed having a geometrically defined center of curvature continued into the adjacent entry and exit profiles, wherein said tooth space is designed asymmetrically on behalf of the steepnesses of its entry and exit profiles and related to a reference plane containing said center of curvature and the axis of said chain wheel.

17 Claims, 2 Drawing Sheets

CHAIN WHEEL

TECHNICAL FIELD

The present invention relates to a chain wheel, and more particularly, a chain wheel usable in an internal combustion engine.

BACKGROUND OF THE INVENTION

Chain wheels for chain drives as are known from practical applications, which are for example used in internal combustion engines or in the engineering industry in general, have a mirror-image or symmetrical tooth space shape with respect to a reference plane that contains the center of curvature of the roll bed and also the chain wheel axis. Upon engagement of the chain, a force or speed pulse which is approximately normal to the surface occurs, inter alia, in the impact point of each chain roll on the entry profile. Upon exit of the chain from the chain wheel, vibrations of the chain that might lead to shocks on the exit profile are unavoidable. The pulses occurring at the impact point and the shocks generated upon exit of the chain produce noise and wear. Theoretical considerations suggest that noise and wear at the entry profile should be the smaller the smaller the opening angle of the tooth space is, i.e. the steeper the profiles are. Practice, however, shows the opposite, i.e. tooth spaces with a small opening angle (e.g. minimum tooth space shape according to the German industrial standard DIN) are noisy and subject to great wear, whereas chain wheels with a large opening angle of the tooth spaces (e.g. maximum tooth space shape according to the German industrial standard DIN) are not so noisy and less prone to wear. Moreover, investigations suggest that in a chain drive the chain wheel does not form a source of uniformly propagating noise, but that the entry portion and the exit portion of the chain are two significant sources of noise and wear, and that the exit portion may even be the predominant source. The reasons for this phenomenon are not sufficiently known. The running noise and the proneness to wear of known chain wheels with symmetrical tooth space shapes are considerable. Even damping rims, which are known in practice, can reduce this disadvantage at both sides of the teeth and the tooth spaces on the chain wheel only to a small extent and only over a short service life, with said damping rims being also acted upon by the straps of the chains. Users of such chain drives, for example car or engine manufacturers, make increasingly greater demands on less noise and wear in chain drives.

SUMMARY OF THE INVENTION

It is the object of the present invention to provide a chain wheel of the above-mentioned type which further reduces noise and wear in comparison with known chain wheels.

Surprisingly enough, the asymmetrical tooth shape considerably reduces noise and wear. In response to the conditions of use of the chain wheel, for instance special requirements of the engine for which the chain drive is used, the entry or exit profile could be steeper. "Steeper" means in the present context a smaller enclosed angle between the reference plane and the one respective profile of the tooth space than between the reference plane and the other respective profile.

In one embodiment, a weak pulse upon impact of the chain roll is produced at the steep entry profile, which reduces noise and wear in the present case. By contrast, the flat exit profile very rapidly refrains from a counter-action with the chain roll in the exit zone of the chain, also under operationally unavoidable vibrations of the chain, so that the effect of this noise source, which is often the predominant one, is minimized and a further wear reduction can be observed there. The chain wheel of this embodiment, however, should operate in a fixed rotational direction in such a manner that the entry profile in the rotational direction is positioned behind the exit profile of the same tooth space.

In an embodiment, noise and wear are largely eliminated specifically upon exit of the chain. In such a tooth space, the for example steeper entry profile is oriented with its profile angle relative to the minimum tooth space shape according to the German industrial standard DIN while the profile angle of the exit profile may be based on the maximum tooth gap shape according to the German industrial standard DIN.

In an embodiment, a chain wheel is obtained with reduced running noise and reduced wear, the profiles of said chain wheel in the tooth spaces following circular-arc sections.

Embodiments of the present invention permit an adaptation of the chain wheel to various conditions of use, with a ratio of 1:2 being especially favorable.

In an alternate embodiment, running noise and wear in the chain drive are additionally reduced by damping rims which use the straps of the chains for carrying purposes. Since each elevation supports the strap at a place where the chain roll cooperates with the entry profile, the force and speed pulses in the impact point are attenuated and dampened in an especially effective manner. The achievable damping action is better than in conventional damping rims that are used in practice.

In an embodiment, an optimum damping effect is achieved because the greatest overlap contact between the straps and the elevations occurs substantially directly below the impact point at the entry profile.

As a rule, damping rims have so far had a short service life because the elastic material of the damping rims is deformed plastically, or energy is transmitted very rapidly, so that specifically critical shear stresses occur in the elastic material. Thanks to the fact that a free deformation space is provided for each peak portion and a defined deformation direction is set, deformation processes take place at a slower pace than has so far been the case, and mainly with a defined deformation direction, whereby critical stresses can be avoided. This increases the service life of the damping rims considerably, which on the other hand has a positive effect on the noise and wear reduction of the chain over a long period of time.

In an embodiment, the damping rim is used together with the asymmetrical tooth space shape. This chain wheel meets the highest demands made by users on noise emission and wear reduction.

In an embodiment, the damping effect is increased and an oriented or directed deformation is enforced. The free deformation space may even be provided with an undercut to achieve favorable load conditions in the elastic material of the damping rims and a soft, adaptive damping action.

A long service life and a satisfactory damping action can be achieved by embodiments of the present invention.

In an embodiment, the damping action of the elastic material of the damping rims is proportioned with respect to a long service life and a constant damping effect. It is ensured that the deformed or displaced mass of the elastic material can operate without any hardening strong compression.

BRIEF DESCRIPTION OF THE DRAWINGS

Embodiments of the subject matter of the invention will now be explained with reference to the drawing, in which.

DESCRIPTION OF THE PREFERRED EMBODIMENTS

Figure 1:
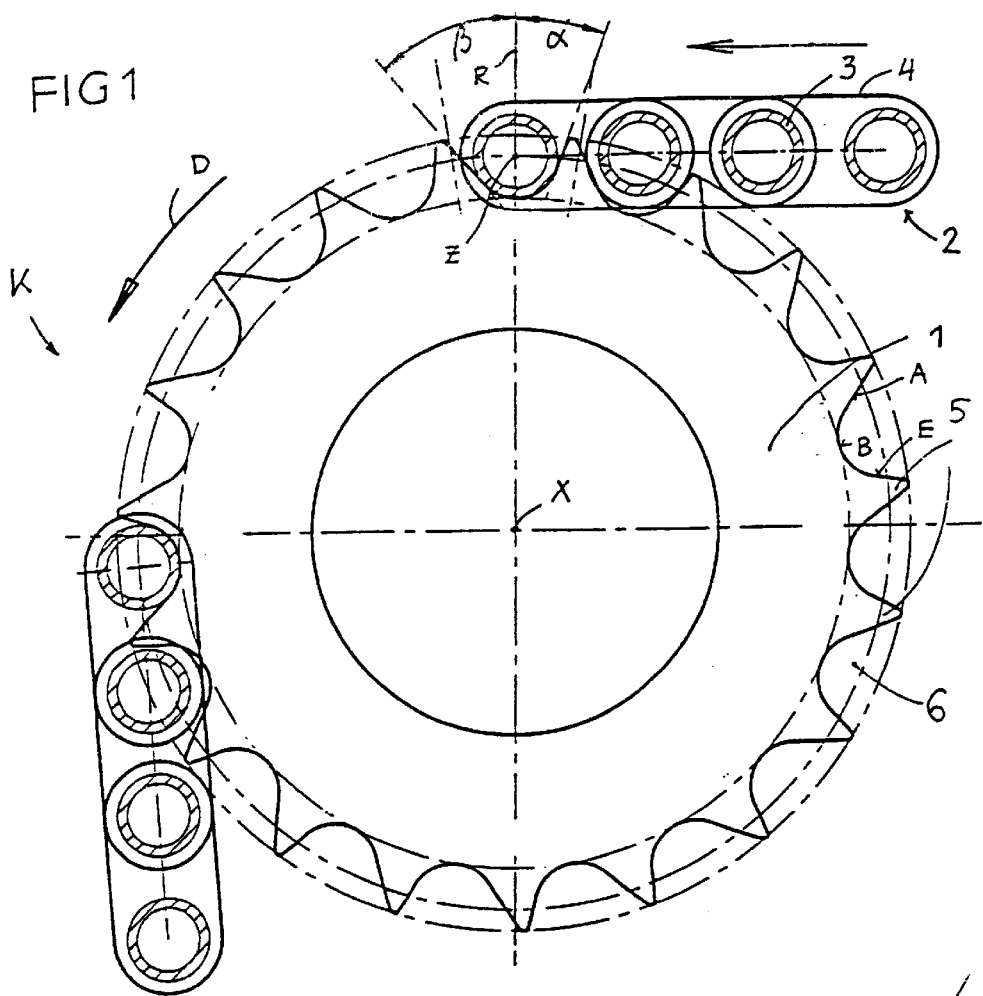
FIG. 1 is a sectional view showing part of a chain drive, for example, of a control chain drive for an internal combustion engine.

FIG. 1 which illustrates a chain drive K shows a chain wheel 1 which is rotatable about a chain wheel axis X in the rotational direction D and which is in engagement over approximately 90° with a chain 2, preferably a roller link chain, comprising chain rolls 3 and straps 4. The chain wheel 1 drives either the chain 2 or it is driven by the chain 2. Teeth 5 with intermediate tooth spaces 6 are arranged on the outer circumference of the chain wheel, with each tooth space 6 having an entry profile E, an exit profile A and a concave roll bed B connecting the profiles. The roll bed B of each tooth space has a geometrically defined center of curvature Z. A theoretical reference plane R which contains the axis X and the center of curvature Z is used for a detailed definition of the shape of the tooth space. Each tooth space 6 is asymmetrical relative to the reference plane R. The entry profile E is steeper with respect to the reference plane R than the exit profile A, i.e., the angle $\alpha$ is smaller than the angle $\beta$. The angle $\beta$ is suitably about twice as great as the angle $\alpha$. For special occasions the asymmetrical configuration could also be reversed.

Profiles A, E may be composed of circular-arc sections or they may follow involutes. The tooth space shape for a chain wheel in the case of which the profiles A, E are composed of circular-arc sections will now be described with reference to FIG. 2.

Figure 2:
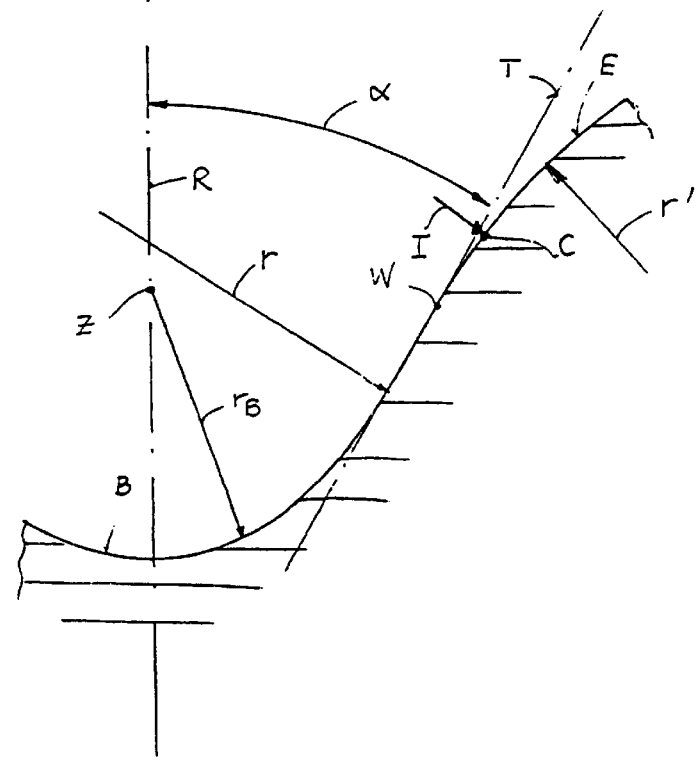
FIG. 2 schematically shows part of a tooth space of the chain wheel of the chain drive of FIG. 1.

FIG. 2 illustrates the center of curvature of roll bed B, which is shown in reference plane R, with the radius of curvature being rB. The entry profile E is composed of a convex circular-arc section with the radius r and a concave circular-arc section with the radius r, with a turning point W being located between the said circular-arc sections, and the circular-arc section passing into the roll bed B with the radius r. The impact point of the chain roll 3 on the entry profile E is outlined at C. At this point the chain roll 3 acts on the entry profile E with a force and speed pulse I which is normal to the surface. A tangent T laid at the turning point W at the entry profile E encloses the angle $\alpha$ with the reference plane R, the angle $\alpha$ being smaller than the angle $\beta$ (not shown in FIG. 2) between a tangent at the turning point of the exit profile A and the same reference plane.

During operation the asymmetrical tooth space shape according to FIGS. 1 and 2 has the effect upon an engaging action of the chain that each chain roll 3 acts on the entry profile E at the impact point C and outputs a relatively small force and speed pulse I because of the smaller angle $\alpha$. Thanks to the steepness of the entry profile E, the energy transmitted by pulse I is small, resulting in a low impact noise and little wear. Upon further rotation of the chain wheel 1, the chain roll 3 comes into full engagement with the roll bed R before leaving the roll bed B in the exit zone of the chain (FIG. 1, left side). In leaving the roll bed the chain roll 3 disengages rapidly and far away from the exit profile A which, in fact, extends at a considerably greater angle $\beta$ relative to the reference plane R. i.e. has a considerably flatter extension, than the entry profile E. Since the exit profile is rapidly released from the chain roll 3 within a very small rotational range of the chain wheel, there will hardly be any noisy and wear-promoting impact contacts with the exit profile A under operationally produced chain vibrations, for example, influenced by a chain tensioner which acts on the chain.

Figure 3:
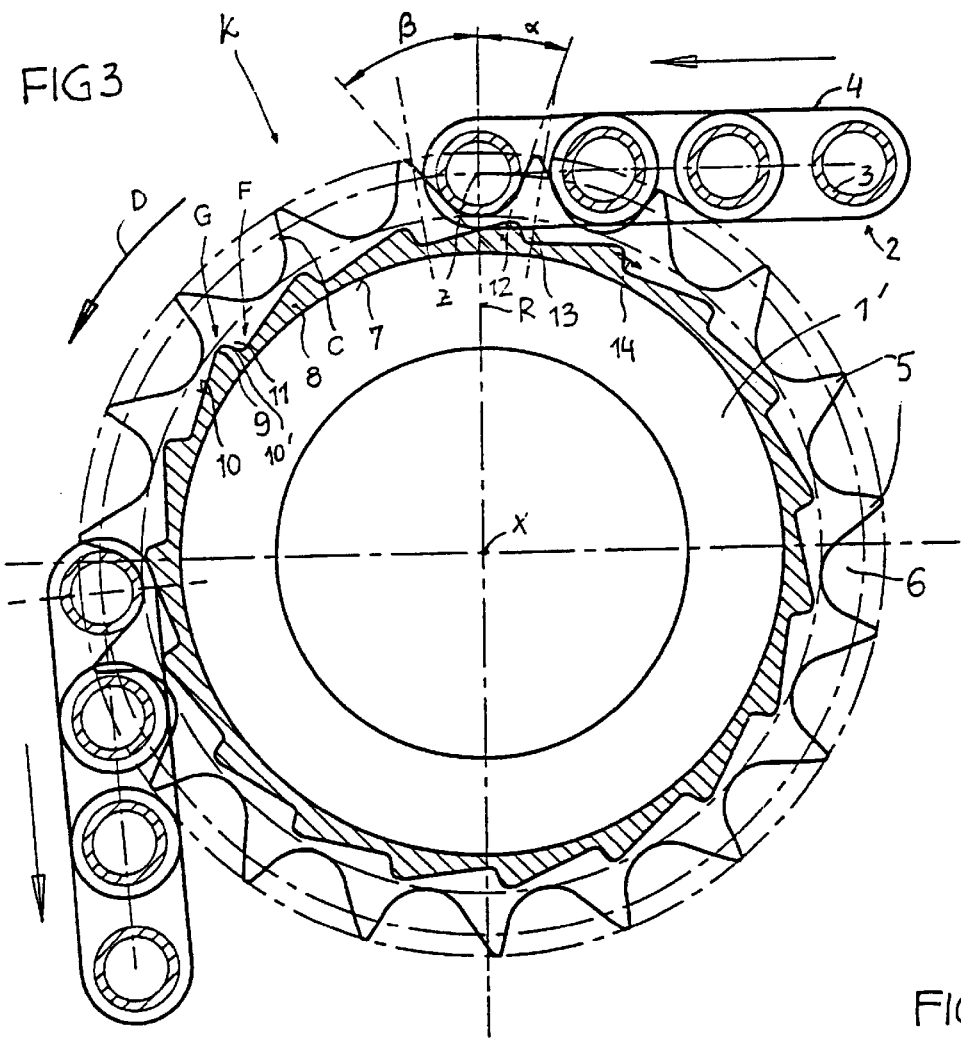
FIG. 3 is a sectional view, similar to FIG. 1, of a further embodiment.

The chain drive K in FIG. 3 is identical with the chain drive K of FIG. 1 with respect to the tooth space shape that is asymmetrical relative to the reference plane R with the angles $\alpha$, $\beta$ of the exit and entry profiles A, E. In addition, a damping rim 8 of an elastically deformable material (plastics or elastomer) is arranged on the chain wheel 1' of FIG. 3, for example on a ring shoulder 7, at each side to effect further silencing and wear reduction. The damping rims 8 use the straps 4 of the chain 2 for carrying purposes, they attenuate the pulses occurring at the impact points C, they dampen vibrations of the chain in the exit zone and disengage the chain rolls 3 in the exit zone rapidly and far away from the exit profiles A.

Two important aspects, which could also be considered singly, but are suitably implemented in combination, are taken into account in each damping rim 8. The first aspect regards an optimized damping effect of the damping rim 8 for impact pulses I. The second aspect increases the service life and durability of the damping rims.

The outer surface of each damping rim 8 alternately comprises elevations G and indentations F in a regular pattern (sawtooth profile). Each elevation G has a peak portion 9 to which a pressure profile 10 with a flat ascent extends from the indentation F which is forwardly positioned in the rotational direction D. A deformation profile 10' with a steep descent extends from the peak portion 9 into the indentation F which in the rotational direction D is at the rear, and into a free deformation space 11 which is provided there. Optionally, the deformation profile 10' has even an undercut (not shown). An overlap contact 12 which leads to a displacement of part of the mass of the elevation G with the rotational direction D in an approximately opposite and defined deformation direction 14 takes place between each strap 4 (bottom edge of the strap 4) and the elevation G.

To optimize the damping effect according to the first aspect, the peak portions 9 of the elevations G are oriented from the axis X approximately radially towards the impact points C at the entry profiles E.

To increase the service life of the damping rims 8 according to the second aspect, an asymmetrical course of the elevations G with the free deformation space 11 and the defined deformation direction 14 has been chosen. As a result, the deformation is not abrupt, but gradual within the free deformation space 11 provided for this purpose.

Figure 4:
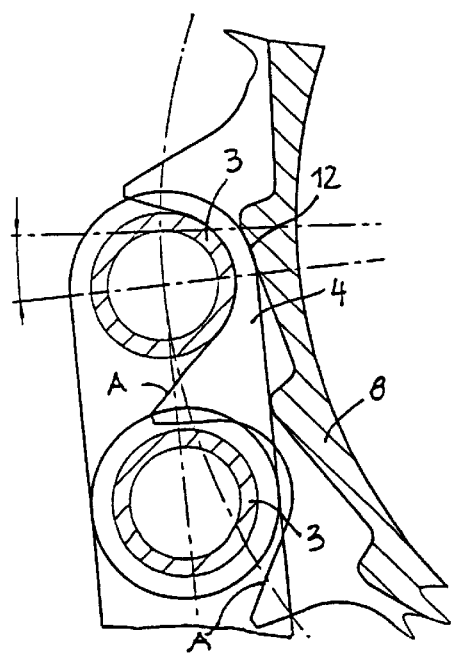
FIG. 4 shows the entry of the chain illustrated in FIG. 3.

In FIG. 4, the strap 4 is already put on the elevation G in the entry zone of the chain before the chain roll 3 contacts the entry profile E at the impact point C. The pulse I is thereby attenuated. The displaced mass 13 of the elevation G enters into the free deformation space 11 in the predetermined deformation direction 14. As soon as the chain roll 3 is in full engagement and is positioned in the roll bed R, the overlap contact is maximum between the bottom side of the strap 4 and the elevation G. The deformation work is performed in a gradual manner and is therefore coped with by the material of the damping rim without any problems, resulting in a long service life of the damping rim.

Figure 5:
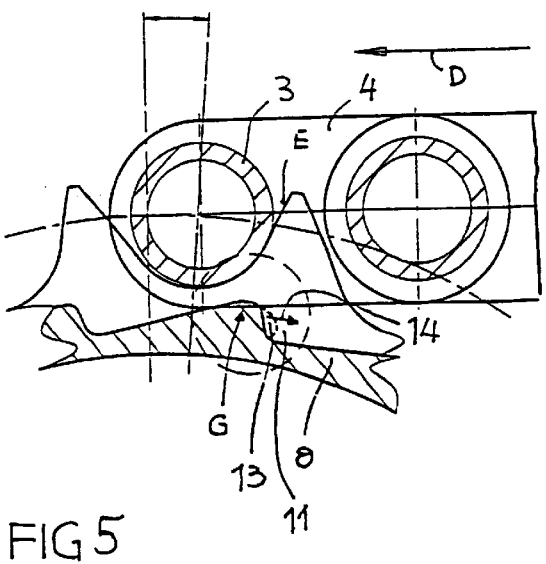
FIG. 5 shows the exit of the chain illustrated in FIG. 3.

In the exit zone of the chain according to FIG. 5, the chain roll 3 starts to detach from the roll bed B, with an overlap contact 12 continuing to exist between the strap 4 and the elevation G, so that the damping rim 8 also carries some weight. After a very small further rotation of the chain wheel 1, the chain roll 3 is very rapidly removed from the exit profile A thanks to the flat exit profile A and the restoring pressure of the elevation G, so that vibrations of the chain will no longer lead to any harmful sudden contacts between the chain roll 3 and the exit profile A. The extent of the maximum overlap contact 12 is expediently adapted to the height difference between the peak portion 9 and the valley of the indentation F in such a manner that the displaced mass 13 supports the strap 4 more and more in a direction opposite to the rotational direction D, but the free deformation space 11 remains available for the mass 13.

I claim:

1. A chain wheel for a chain drive of an internal combustion engine with a chain and a driving and/or driven chain wheel, comprising a plurality of alternating teeth and tooth spaces, at least a portion of the chain wheel being engaged with the chain at all times during operation of the chain drive, the profiles of the teeth and tooth spaces being shaped as circular-arc sections or involutes, with each of said tooth spaces having a concave roll bed that passes into the adjacent entry and exit profiles and has a geometrically defined center of curvature, wherein each said tooth space has an asymmetrical shape with respect to the steepness of its entry and exit profiles, based on a reference plane containing said center of curvature and the chain wheel axis, the teeth and tooth spaces being shaped and sized to reduce noise and tooth wear at the entrance and exit regions of the teeth during operation of the chain drive.

2. A chain wheel according to claim 1, wherein said entry profile is steeper with respect to said reference plane than said exit profile, and the curve of inclination of said exit profile with respect to the curve of inclination of said entry profile is made flat in such a manner that said chain, which is vibrating due to operation, is liftable from said roll bed substantially without any subsequent contacts with said exit profile.

3. A chain wheel according to claim 2, wherein said entry and exit profiles follow circular-arc sections with a turning point, and that a tangent at the turning point of said entry profile encloses an angle with reference plane that is smaller than the angle between said tangent at the turning point of said exit profile and said reference plane, and wherein said angles have a mutual relationship of about 1:2.

4. A chain wheel according to claim 1, wherein the transition between the circular-arc section of said entry profile and said roll bed is spaced radially further from said chain wheel axis than the respective transition in said exit profile.

5. A chain wheel according to claim 1, wherein the shape of each of said tooth spaces is defined by a plurality of circular-arc sections, each circular-arc section having a radius different than the adjacent circular-arc sections.

6. A chain wheel according to claim 1, wherein the shape of each of said tooth spaces is defined by a plurality of involutes and circular-arc sections.

7. A chain wheel according to claim 1, wherein an elastically deformable damping rim is provided axially at least at one side of said teeth with circumferentially alternating elevations for an overlap contact with straps of said chain, and with indentations, and that a peak portion of each elevation is arranged within an area which is defined by the radian measure length of said entry profile.

8. A chain wheel according to claim 7, wherein said peak portion and portion of maximum overlap contact between said strap and said elevation is oriented with respect to said chain wheel axis approximately radially towards the impact point of said chain roll on said entry profile.

9. A chain wheel according to claim 7, wherein said elevation has a pressure profile with a flat ascent from the one indentation to said peak portion, and a deformation profile with a steeper descent relative to said pressure profile of said peak portion into the free deformation space in the subsequent indentation.

10. A chain wheel according to claim 7, wherein, when viewed from said chain wheel axis, said pressure profile is approximately oriented towards said roll bed and said deformation profile is approximately oriented towards said entry profile.

11. A chain wheel according to claim 7, wherein said damping rim forms a regular sawtooth profile with its outer circumference in that flat sawtooth-shaped pressure profiles ascend in a direction opposite to the rotational direction of said chain wheel and the peak portions of the sawteeth are radially oriented approximately with the impact points of said chain rolls in said entry profiles.

12. A chain wheel according to claim 7, wherein the radial measure of the maximum overlap contact is smaller than the radially viewed height difference between said peak portions and the valleys of said indentations.

13. A chain wheel according to claim 1, wherein an elastically deformable damping rim is provided axially at least at one side of said teeth with circumferentially alternating elevations for an overlapping contact with straps of said chain, and with indentations, and that each elevation, when viewed in the direction of said axis, has an asymmetrical course with a free deformation space which follows a peak portion of each elevation in circumferential direction and by which a deformation direction of said elevation, which is defined with respect to the rotational direction of said chain wheel, is adjustable under overlapping contact with said strap.

14. A chain wheel according to claim 13, wherein said elevation has a pressure profile with a flat ascent from the one indentation to said peak portion, and a deformation profile with a steeper descent relative to said pressure profile of said peak portion into the free deformation space in the subsequent indentation.

15. A chain wheel according to claim 13, wherein, when viewed from said chain wheel axis, said pressure profile is approximately oriented towards said roll bed and said deformation profile is approximately oriented towards said entry profile.

16. A chain wheel according to claim 13, wherein said damping rim forms a regular sawtooth profile with its outer circumference in that flat sawtooth-shaped pressure profiles ascend in a direction opposite to the rotational direction of said chain wheel and the peak portions of the sawteeth are radially oriented approximately with the impact points of said chain rolls in said entry profiles.

17. A chain wheel according to claim 13, wherein the radial measure of the maximum overlap contact is smaller than the radially viewed height difference between said peak portions and the valleys of said indentations.

* * * * *